US007044988B2

(12) United States Patent
Filippini et al.

(10) Patent No.: US 7,044,988 B2
(45) Date of Patent: May 16, 2006

(54) PARTIALLY DEHYDRATED REACTION PRODUCT, PROCESS FOR MAKING SAME, AND EMULSION CONTAINING SAME

(75) Inventors: Brian B. Filippini, Mentor, OH (US);
Richard M. Lange, Euclid, OH (US);
Bryan A. Grisso, Wickliffe, OH (US);
Bryn Hird, Cincinnati, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/646,281

(22) Filed: Aug. 22, 2003

(65) Prior Publication Data
US 2004/0055677 A1    Mar. 25, 2004

Related U.S. Application Data

(63) Continuation of application No. 09/490,759, filed on Jan. 24, 2000, now Pat. No. 6,780,209.

(51) Int. Cl.
*C10L 1/22* (2006.01)
(52) U.S. Cl. .................... 44/347; 44/386; 508/452; 508/527
(58) Field of Classification Search ............ 44/347, 44/386; 508/452, 527
See application file for complete search history.

(56) References Cited

U.S. PATENT DOCUMENTS

| | | | |
|---|---|---|---|
| 2,868,781 A | 1/1959 | Gaertner et al. | 260/234 |
| 2,973,353 A | 2/1961 | Gaertner | 260/234 |
| 3,256,321 A | 6/1966 | Durr, Jr. et al. | 260/488 |
| 3,331,776 A | 7/1967 | Krukziener et al. | 252/56 |
| 3,522,179 A | 7/1970 | LeSuer | 252/51.5 |
| 3,956,154 A | 5/1976 | Marolewski et al. | 252/78 |
| 4,029,675 A | 6/1977 | Williams et al. | 260/343.6 |
| 4,119,553 A | 10/1978 | Cane et al. | 560/198 |
| 4,289,896 A | 9/1981 | Buxbaum | 560/92 |
| 4,374,034 A | 2/1983 | Coleman | 252/51.5 A |
| 4,596,886 A | 6/1986 | Hasegawa et al. | 560/90 |
| 4,613,342 A * | 9/1986 | Dorer et al. | 44/334 |
| 4,708,753 A | 11/1987 | Forsberg | 149/2 |
| 4,770,803 A | 9/1988 | Forsberg | 252/75 |
| 4,839,068 A | 6/1989 | Lange | 252/33.6 |
| 4,844,756 A | 7/1989 | Forsberg | 149/2 |
| 4,888,441 A | 12/1989 | Calbo, Jr. et al. | 560/198 |
| 5,047,175 A | 9/1991 | Forsberg | 252/356 |
| 5,080,817 A | 1/1992 | Meyer | 252/56 D |
| 5,260,345 A | 11/1993 | DesMarais et al. | 521/148 |
| 5,268,224 A | 12/1993 | DesMarais et al. | 428/286 |
| 5,331,015 A | 7/1994 | DesMarais et al. | 521/62 |
| 5,387,207 A | 2/1995 | Dyer et al. | 604/369 |
| 5,401,341 A | 3/1995 | Forsberg et al. | 149/46 |
| 5,500,451 A | 3/1996 | Goldman et al. | 521/64 |
| 5,512,079 A | 4/1996 | Jahnke et al. | 71/64.08 |
| 5,518,517 A | 5/1996 | Jahnke et al. | 71/64.08 |
| 5,550,167 A | 8/1996 | DesMarais | 521/50 |
| 5,632,737 A | 5/1997 | Stone et al. | 604/358 |
| 5,633,291 A | 5/1997 | Dyer et al. | 521/64 |

(Continued)

FOREIGN PATENT DOCUMENTS

EP    0 561 607 A2    9/1993

(Continued)

OTHER PUBLICATIONS

Search Report from corresponding PCT International Application PCT/US01/01939 dated Jun. 27, 2002.

(Continued)

*Primary Examiner*—Aileen Felton
(74) *Attorney, Agent, or Firm*—Samuel B. Laferty; Neil A. DuChez; Michael F. Esposito

(57) ABSTRACT

The disclosed invention relates to a composition comprising a partially dehydrated product made by:

(I) reacting (A) a hydrocarbyl substituted succinic acid or anhydride with (B) a polyol, a polyamine, a hydroxyamine, or a mixture of two or more thereof, to form a first intermediate product comprising: an ester, partial ester or mixture thereof when (B) is a polyol; an amide, imide, salt, amide/salt, partial amide or mixture of two or more thereof when (B) is a polyamine; or an ester, partial ester, amide, partial amide, amide/salt, imide, ester/salt, salt or a mixture of two or more thereof when (B) is a hydroxyamine, a mixture of a polyol and a polyamine, a mixture of a polyol and a hydroxyamine, a mixture of a polyamine and a hydroxyamine, or a mixture of a polyol, a polyamine and a hydroxyamine; the hydrocarbyl substituent of said acid or anhydride having an average of about 8 to about 200 carbon atoms; and (II) heating said first intermediate product at an effective temperature to form a second intermediate product with water of reaction being formed, and separating a portion of said water of reaction from said second intermediate product, when (A) is said succinic anhydride the amount of water of reaction that is separated is from about 0.2 to about 0.9 equivalents of said water of reaction per equivalent of said succinic anhydride, when (A) is said succinic acid the amount of water of reaction that is separated is from about 1.2 to about 1.9 moles of said water of reaction per equivalent of said succinic acid, said partially dehydrated product having a total acid number in the range of about 20 to about 100 mg of KOH/g.

A process for making the foregoing partially dehydrated product is also disclosed. Emulsions comprising an organic phase, an aqueous phase, and an emulsifying amount of the foregoing partially dehydrated product are disclosed.

25 Claims, No Drawings

U.S. PATENT DOCUMENTS

| | | | |
|---|---|---|---|
| 5,650,158 A | 7/1997 | Eierdanz et al. | 424/401 |
| 5,753,359 A | 5/1998 | Dyer et al. | 428/315.5 |
| 5,770,634 A | 6/1998 | Dyer et al. | 521/64 |
| 5,786,395 A | 7/1998 | Stone et al. | 521/64 |
| 5,795,921 A | 8/1998 | Dyer et al. | 521/146 |
| 5,858,055 A | 1/1999 | Jahnke et al. | 71/27 |
| 5,872,149 A | 2/1999 | Dralle-Voss et al. | 51/533 |
| 5,920,031 A | 7/1999 | Jahnke | 149/2 |
| 6,207,724 B1 | 3/2001 | Hird et al. | 521/64 |

FOREIGN PATENT DOCUMENTS

| | | |
|---|---|---|
| EP | 0 657 522 A2 | 6/1995 |
| EP | 0 711 740 A1 | 5/1996 |
| EP | 9625384 | 8/1996 |
| EP | 0 989 176 A1 | 3/2000 |
| WO | WO94/00508 | 1/1994 |
| WO | WO 97/37745 | 10/1997 |

OTHER PUBLICATIONS

Z. Bhumgara, "Polyhip Foam Materials as Filtration Media," *Filtration & Separation*, Mar. 1995, pp. 245-251.

D. C. Walsh et al., "PolyHIPE Foams: Production, Characterisations, and Performance as Aerosol Filtration Materials," *J. Aerosol Sci*, 1996, vol. 27, pp. 5629-5630.

S. Ganguly et al., "Surfactant-electrolyte interactions in concentrated water-in-oil emulsions: FT-IR spectroscopic and low-temperature differential scanning calorimetric studies," *Colloids and Surfaces*, 65 (1992) pp. 243-256.

S. Gangely et al.; Surfactant-electrolyte interactions in concentrated water-in-oil emulsions: FT-IR spectroscopic and low-temperature differential scanning calorimetric studies; *Colloids and Surfaces*. 65 (1992) pp. 243-256.

U.S. Appl. No. 09/490,645, filed Jan. 24, 2000.

* cited by examiner

US 7,044,988 B2

PARTIALLY DEHYDRATED REACTION PRODUCT, PROCESS FOR MAKING SAME, AND EMULSION CONTAINING SAME

This is a continuation of application Ser. No. 09/490,759 filed Jan. 24, 2000, now U.S. Pat. No. 6,780,209.

TECHNICAL FIELD

This invention relates to partially dehydrated reaction products derived from (A) a hydrocarbyl substituted succinic acid or anhydride, and (B) a polyol, polyamine, hydroxyamine or mixture of two or more thereof. The invention also relates to a process for making these partially dehydrated reaction products. The inventive reaction products are useful as emulsifiers in making emulsions, especially explosive emulsions and emulsion fertilizers.

BACKGROUND OF THE INVENTION

Explosive emulsions typically comprise a continuous organic phase and a discontinuous oxidizer phase containing water and an oxygen-supplying source such as ammonium nitrate, and an emulsifier. Examples of such explosive emulsions are disclosed, inter alia, in U.S. Pat. Nos. 4,708,753 and 5,920,031. In U.S. Pat. No. 4,708,753 the emulsifier is a salt derived from a hydrocarbyl-substituted carboxylic acid or anhydride, or ester or amide derivative of said acid or anhydride, the hydrocarbyl substituent having an average of from about 20 to about 500 carbon atoms, and an amine. In U.S. Pat. No. 5,920,031 the emulsifier is the product made by the reaction of component (A) with component (B). Component (A) is a substituted succinic acylating agent, said substituted succinic acylating agent consisting of substituent groups and succinic groups wherein the substituent groups are derived from a polyalkene, said acylating agents being characterized by the presence within their structure of an average of at least 1.3 succinic groups for each equivalent weight of substituent groups. Component (B) is ammonia and/or a mono-amine.

U.S. Pat. No. 5,512,079 discloses an emulsion fertilizer comprising a discontinuous aqueous phase comprising at least one fertilizer component such as ammonium nitrate; a continuous oil phase; and an emulsifier. The emulsifier is the reaction product of a hydrocarbyl substituted succinic anhydride acylating agent and a tertiary alkanol amine.

A problem in the explosive emulsion and emulsion fertilizer arts relates to the fact that it is desirable to lower the viscosities of the emulsions in order to improve their pumping and handling characteristics. It is also desirable to make emulsions with relatively high aqueous phase to organic phase weight ratios. This is advantageous with explosive emulsions because it permits the delivery of more of the oxygen-supplying source with the same weight of emulsion. Similarly, this is advantageous with emulsion fertilizers because it permits the delivery of more of the fertilizer component with the same weight of emulsion. Unexpectedly, by use of the inventive reaction products as emulsifiers it is possible to formulate explosive emulsions and emulsion fertilizers having these characteristics. Going beyond explosive emulsions and emulsion fertilizers, the inventive reaction products are useful as emulsifiers in a wide variety of applications.

PCT publication WO96/25384 discloses monomeric, oligomeric and polymeric bisesters of alkyl- or alkenyldicarboxylic acid derivatives and polyalcohols, and their use as solubilizers, emulsifiers and/or detergents. The bisesters are described as being useful in formulating cosmetic compositions, detergents and cleaners, pharmaceutical compositions, foodstuffs and crop protection compositions. A process for preparing these bisesters is disclosed.

SUMMARY OF THE INVENTION

This invention relates to a composition comprising a partially dehydrated product made by:

(I) reacting (A) a hydrocarbyl substituted succinic acid or anhydride with (B) a polyol, a polyamine, a hydroxyamine, or a mixture of two or more thereof, to form a first intermediate product comprising: an ester, partial ester or mixture thereof when (B) is a polyol; an amide, imide, salt, amide/salt, partial amide or mixture of two or more thereof when (B) is a polyamine; or an ester, partial ester, amide, partial amide, amide/salt, imide, ester/salt, salt or a mixture of two or more thereof when (B) is a hydroxyamine, a mixture of a polyol and a polyamine, a mixture of a polyol and a hydroxyamine, a mixture of a polyamine and a hydroxyamine, or a mixture of a polyol, a polyamine and a hydroxyamine; the hydrocarbyl substituent of said acid or anhydride having an average of about 8 to about 200 carbon atoms; and (II) heating said first intermediate product at an effective temperature to form a second intermediate product with water of reaction being formed, and separating a portion of said water of reaction from said second intermediate product to form said partially dehydrated product, when (A) is said succinic anhydride the amount of water of reaction that is separated is from about 0.2 to about 0.9 moles of said water of reaction per equivalent of said succinic anhydride, when (A) is said succinic acid the amount of water of reaction that is separated is from about 1.2 to about 1.9 moles of said water of reaction per equivalent of said succinic acid, said partially dehydrated product having an acid number in the range of about 20 to about 100 mg of KOH/g.

This invention also relates to a process, comprising:

(I) reacting (A) a hydrocarbyl substituted succinic acid or anhydride with (B) a polyol, a polyamine, a hydroxyamine, or a mixture of two or more thereof, to form a first intermediate product comprising: an ester, partial ester or mixture thereof when (B) is a polyol; an amide, imide, salt, amide/salt, partial amide or mixture of two or more thereof when (B) is a polyamine; or an ester, partial ester, amide, partial amide, amide/salt, imide, ester/salt, salt or a mixture of two or more thereof when (B) is a hydroxyamine; a mixture of a polyol and a polyamine, a mixture of a polyol and a hydroxyamine, a mixture of a polyamine and a hydroxyamine, or a mixture of a polyol, a polyamine and a hydroxyamine; the hydrocarbyl substituent of said acid or anhydride having an average of about 8 to about 200 carbon atoms; and (II) heating said first intermediate product at an effective temperature to form a second intermediate product with water of reaction being formed, and separating a portion of said water of reaction from said second intermediate product to form said partially dehydrated product, when (A) is said succinic anhydride the amount of water of reaction that is separated is from about 0.2 to about 0.9 equivalents of said water of reaction per equivalent of said succinic anhydride, when (A) is said succinic acid the amount of water of reaction that is separated is from about 1.2 to about 1.9 moles of said water of reaction per equivalent of said succinic acid, said partially dehydrated product having a total acid number in the range of about 20 to about 100 mg of KOH/g.

This invention also relates to emulsions, comprising: an organic phase; an aqueous phase; and an emulsifying amount of the foregoing partially dehydrated product.

As indicated above, the inventive partially dehydrated reaction products are useful as emulsifiers in formulating emulsions for a wide variety of applications. These include one or more of the following: lubricants or functional fluids; fuels; paints; coatings; inks; caulks or adhesives; fertilizers or agricultural chemicals; refinery or oil-field products; mining products; explosives; commodity chemical manufacturing processes; processes involving the use of emulsions containing 2-acrylamido-2-methyl-1-propane sulfonic acid monomer; and the like.

DETAILED DESCRIPTION OF THE PREFERRED EMBODIMENTS

As used herein, the terms hydrocarbyl substituent, hydrocarbyl group, hydrocarbon group, and the like, are used to refer to a group having one or more carbon atoms directly attached to the remainder of a molecule and having a hydrocarbon or predominantly hydrocarbon character. Examples include:

(1) purely hydrocarbon groups, that is, aliphatic (e.g., alkyl, alkenyl or alkylene), alicyclic (e.g., cycloalkyl, cycloalkenyl) groups, aromatic groups, and aromatic-, aliphatic-, and alicyclic-substituted aromatic groups, as well as cyclic groups wherein the ring is completed through another portion of the molecule (e.g., two substituents together forming an alicyclic group);

(2) substituted hydrocarbon groups, that is, hydrocarbon groups containing non-hydrocarbon groups which, in the context of this invention, do not alter the predominantly hydrocarbon nature of the group (e.g., halo, hydroxy, alkoxy, mercapto, alkylmercapto, nitro, nitroso, and sulfoxy);

(3) hetero substituted hydrocarbon groups, that is, hydrocarbon groups containing substituents which, while having a predominantly hydrocarbon character, in the context of this invention, contain other than carbon in a ring or chain otherwise composed of carbon atoms. Heteroatoms include sulfur, oxygen, nitrogen. In general, no more than two, and in one embodiment no more than one, non-hydrocarbon substituent is present for every ten carbon atoms in the hydrocarbon group.

The term "lower" when used in conjunction with terms such as alkyl, alkenyl, alkoxy, and the like, is intended to describe such groups that contain a total of up to 7 carbon atoms.

The term "water-soluble" refers to materials that are soluble in water to the extent of at least one gram per 100 milliliters of water at 25° C.

The term "oil soluble" refers to materials that are soluble in mineral oil to the extent of at least one gram per 100 milliliters of mineral oil at 25° C.

The term "total acid number" (TAN) refers to a measure of the amount of potassium hydroxide (KOH) needed to neutralize all of the acidity of a product or a composition. The sample to be tested is dissolved in a toluene and tert-butyl alcohol solvent and titrated potentiometrically with a solution of tetra-n-butylammonium hydroxide. The toluene and tert-butyl alcohol solvent is prepared by diluting 100 ml of 25% methanolic tert-butyl alcohol and 200 ml of isopropyl alcohol to one liter total volume with toluene. The solution of tetra-n-butylammonium hydroxide is a 25% by weight solution in methyl alcohol. A Metrohm Standard pH Combination Glass Electrode EA 120 (3M aq. KCl), which is a combination glass-plus-reference electrode, is used. The end-points corresponding to the inflections are obtained from the titration curve and the acid numbers calculated.

The term "total base number" (TBN) refers to a measure of the amount of acid (perchloric or hydrochloric) needed to neutralize the basicity of a product or a composition, expressed as KOH equivalents. It is measured using Test Method ASTM D 2896.

The number of "equivalents" of a hydrocarbyl substituted succinic acid or anhydride is dependent on the number of carboxylic functions (e.g., —C(=O)—) present in the acid or anhydride. Thus, the number of equivalents of acid or anhydride will vary with the number of succinic groups present therein. In determining the number of equivalents of acid or anhydride, those carboxylic functions which are not capable of reacting with the polyol, polyamine or hydroxyamine (B) are excluded. In general, however, there are two equivalents of acid or anhydride for each succinic group in the acid or anhydride. Conventional techniques are readily available for determining the number of carboxylic functions (e.g., acid number, saponification number) and, thus, the number of equivalents of the acid or anhydride available to react with component (B).

An "equivalent" of a polyol is that amount of polyol corresponding to the total weight of polyol divided by the total number of hydroxyl groups present. Thus, glycerol has an equivalent weight equal to one-third its molecular weight.

An "equivalent" of a polyamine is that amount of polyamine corresponding to the total weight of the polyamine divided by the number of nitrogen atoms present which are capable of reacting with a hydrocarbyl substituted succinic acid or anhydride. Thus, octylamine has an equivalent weight equal to its molecular weight; ethylene diamine has an equivalent weight equal to one-half of its molecular weight. The equivalent weight of a commercially available mixture of polyalkylene polyamines can be determined by dividing the atomic weight of nitrogen (14) by the % N contained in the polyamine; thus, a polyalkylene polyamine mixture having a % N of 34 would have an equivalent weight of 41.2.

An "equivalent" of a hydroxyamine is that amount of hydroxyamine corresponding to the total weight of hydroxyamine divided by the number of hydroxyl groups and nitrogen atoms present which are capable of reacting with a hydrocarbyl substituted succinic acid or anhydride. Thus, diethanolamine has an equivalent weight equal to one-third its molecular weight.

The Partially Dehydrated Reaction Product

The hydrocarbyl substituted succinic acid or anhydride (A) may be represented by the formulae

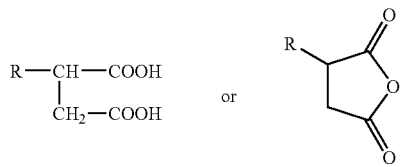

wherein in each of the above formulae, R is a hydrocarbyl group of about 12 to about 200 carbon atoms, and in one embodiment about 12 to about 150 carbon atoms, and in one embodiment about 12 to about 100 carbon atoms, and in one embodiment about 12 to about 75 carbon atoms, and in one embodiment about 12 to about 50 carbon atoms, and in one embodiment about 18 to about 30 carbon atoms. In one embodiment, R is an alkyl or an alkenyl group.

In one embodiment, a mixture of at least two hydrocarbyl substituted succinic acids or anhydrides is used. The hydrocarbyl substituent of one of the acids or anhydrides has an average of about 12 to about 24 carbon atoms, and in one embodiment about 14 to about 18 carbon atoms, and in one embodiment at 16 carbon atoms. The hydrocarbyl substituent of the other acid or anhydride has an average of about 60 to about 200 carbon atoms, and in one embodiment about 60 to about 150 carbon atoms, and in one embodiment about 60 to about 100 carbon atoms, and in one embodiment about 60 to about 75 carbon atoms.

The hydrocarbyl group R in the above formulae may be derived from an alpha-olefin or an alpha-olefin fraction. The alpha-olefins include 1-dodecene, 1-tridecene, 1-tetradecene, 1-pentadecene, 1-hexadecene, 1-heptadecene, 1-octadecene, 1-eicosene, 1-docosene, 1-triacontene, and the like. The alpha olefin fractions that are useful include $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{18-24}$ alpha-olefins, $C_{18-30}$ alpha-olefins, and the like. Mixtures of two or more of any of the foregoing alpha-olefins or alpha-olefin fractions may be used.

In one embodiment, R in the above formulae is a hydrocarbyl group derived from an olefin oligomer or polymer. The olefin oligomer or polymer may be derived from an olefin monomer of 2 to about 10 carbon atoms, and in one embodiment about 3 to about 6 carbon atoms, and in one embodiment about 4 carbon atoms. Examples of the monomers include ethylene; propylene; butene-1; butene-2; isobutene; pentene-1; heptene-1; octene-1; nonene-1; decene-1; pentene-2; or a mixture of two of more thereof.

In one embodiment, R in the above formulae is a polyisobutene group. The polyisobutene group may be made by the polymerization of a $C_4$ refinery stream having a butene content of about 35 to about 75% by weight and an isobutene content of about 30 to about 60% by weight.

In one embodiment, R in the above formulae is a polyisobutene group derived from a polyisobutene having a high methylvinylidene isomer content, that is, at least about 50% and in one embodiment at least about 70% methylvinylidenes. Suitable high methylvinylidene polyisobutenes include those prepared using boron trifluoride catalysts. The preparation of such polyisobutenes in which the methylvinylidene isomer comprises a high percentage of the total olefin composition is described in U.S. Pat. Nos. 4,152,499 and 4,605,808, the disclosure of each of which are incorporated herein by reference.

In one embodiment, the hydrocarbyl-substituted succinic acid or anhydride (A) consists of hydrocarbyl substituent groups and succinic groups. The hydrocarbyl substituent groups are derived from an olefin polymer as discussed above and, in one embodiment, have a number average molecular weight in the range of about 750 to about 3000, and in one embodiment about 900 to about 2000. The hydrocarbyl substituted succinic acid or anhydride is characterized by the presence within its structure of an average of at least about 1.3 succinic groups, and in one embodiment from about 1.5 to about 2.5, and in one embodiment form about 1.7 to about 2.1 succinic groups for each equivalent weight of the hydrocarbyl substituent.

For purposes of this invention, the equivalent weight of the hydrocarbyl substituent group of the hydrocarbyl-substituted succinic acid or anhydride is deemed to be the number obtained by dividing the number average molecular weight ($M_n$) of the polyolefin from which the hydrocarbyl substituent is derived into the total weight of all the hydrocarbyl substituent groups present in the hydrocarbyl-substituted succinic acid or anhydride. Thus, if a hydrocarbyl-substituted acylating agent is characterized by a total weight of all hydrocarbyl-substituents of 40,000 and the $M_n$ value for the polyolefin from which the hydrocarbyl substituent groups are derived is 2000, then that substituted succinic acid or anhydride is characterized by a total of 20 (40,000/2000=20) equivalent weights of substituent groups.

The ratio of succinic groups to equivalent of substituent groups present in the hydrocarbyl-substituted succinic acid or anhydride (also called the "succination ratio") may be determined by one skilled in the art using conventional techniques (such as from saponification or acid numbers). For example, the formula below can be used to calculate the succination ratio where maleic anhydride is used.

$$SR = \frac{M_n \times (\text{Sap. No. of acylating agent})}{(56100 \times 2) - (98 \times \text{Sap. No. of acylating agent})}$$

In this equation, SR is the succination ratio, $M_n$ is the number average molecular weight, and Sap. No. is the saponification number. In the above equation, Sap. No. of acylating agent=measured Sap. No. of the final reaction mixture/Al wherein Al is the active ingredient content expressed as a number between 0 and 1, but not equal to zero. Thus an active ingredient content of 80% corresponds to an Al value of 0.8. The Al value can be calculated by using techniques such as column chromatography which can be used to determine the amount of unreacted polyalkene in the final reaction mixture. As a rough approximation, the value of Al is determined after subtracting the percentage of unreacted polyalkene from 100.

In one embodiment, the polyol (B) is a compound represented by the formula

R—(OH)$_m$ wherein in the foregoing formula, R is an organic group having a valency of m, R is joined to the OH groups through carbon-to-oxygen bonds, and m is an integer from 2 to about 10, and in one embodiment 2 to about 6. The polyol may be a glycol, a polyoxyalkylene glycol, a carbohydrate, or a partially esterfied polyhydric alcohol. Examples of the polyols that may be used include ethylene glycol, diethylene glycol, triethylene glycol, tetraethylene glycol, propylene glycol, dipropylene glycol, tripropylene glycol, dibutylene glycol, tributylene glycol, 1,2-butanediol, 2,3-dimethyl-2,3-butanediol, 2,3-hexanediol, 1,2-cyclohexanediol, pentaerythritol, dipentaerythritol, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, 2,2,6,6-tetrakis-(hydroxymethyl) cyclohexanol, 1,10-decanediol, digitalose, 2-hydroxymethyl-2-methyl-1,3-propanediol-(tri-methylolethane), or 2-hydroxymethyl-2-ethyl-1,3-propanediol-(tri-methylopropane), and the like. Mixtures of two or more of the foregoing can be used.

In one embodiment, the polyol is a sugar, starch or mixture thereof. Examples of these include erythritol, threitol, adonitol, arabitol, xylitol, sorbitol, mannitol, erythrose, fucose, ribose, xylulose, arabinose, xylose, glycose, fructose, sorbose, mannose, sorbitan, glucosamine, sucrose, rhamnose, glyceraldehyde, galactose, and the like. Mixtures of two or more of the foregoing can be used.

In one embodiment, the polyol is a compound represented by the formula

HO(CH$_2$CH(OH)CH$_2$O)$_n$H wherein n is a number in the range of 1 to about 5, and in one embodiment 1 to about 3. Examples include glycerol, diglycerol, triglycerol, and the like. Mixtures as well as isomers of the foregoing may be used.

In one embodiment, the polyol is a polyhydric alcohol having at least three hydroxyl groups, wherein some of the hydroxyl groups are esterfied with an aliphatic monocarboxylic acid of about 8 to about 30 carbon atoms, but at least two of the hydroxyl groups are not esterfied. Examples include monooleate of glycerol, monostearate of glycerol, monooleate of sorbitol, distearate of sorbitol, di-dodecanoate of erythritol, the like. Mixtures of two or more of the foregoing can be used.

The polyamine (B) may be aliphatic, cycloaliphatic, heterocyclic or aromatic compound. Examples include alkylene polyamines and heterocyclic polyamines. The alkylene polyamines may be represented by the formula

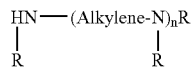

wherein n has an average value between 1 and about 10, and in one embodiment about 2 to about 7, the "Alkylene" group has from 1 to about 10 carbon atoms, and in one embodiment about 2 to about 6 carbon atoms, and each R is independently hydrogen or an aliphatic or hydroxy-substituted aliphatic group of up to about 30 carbon atoms. These alkylene polyamines include ethylene polyamines, butylene polyamines, propylene polyamines, pentylene polyamines, etc. The higher homologs and related heterocyclic amines such as piperazines and N-amino alkyl-substituted piperazines are also included. Specific examples of such polyamines include ethylene diamine, triethylene tetramine, tris-(2-amino ethyl)amine, propylene diamine, trimethylene diamine, tripropylene tetramine, tetraethylene pentamine, hexa-ethylene heptamine, pentaethylene hexamine, or a mixture of two or more thereof.

Ethylene polyamines, such as some of those mentioned above, are useful. Such polyamines are described in detail under the heading Ethylene Amines in Kirk Othmer's "Encyclopedia of Chemical Technology", 2nd Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as piperazines. Ethylene polyamine mixtures are useful.

The polyamine may also be a heterocyclic polyamine. Among the heterocyclic polyamines are aziridines, azetidines, azolidines, tetra- and dihydropyridines, pyrroles, indoles, piperidines, imidazoles, di- and tetra hydroimidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Useful heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalky-substituted piperazines, morpholine, aminoalkyl-substituted morpholines, pyrrolidine, and aminoalkyl-substituted pyrrolidines, are useful. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine.

The hydroxyamine (B) may be a primary, secondary or tertiary amine. The terms "hydroxyamine" and "aminoalcohol" describe the same class of compounds and, therefore, can be used interchangeably. In one embodiment, the hydroxyamine is (a) an N-(hydroxyl-substituted hydrocarbyl) amine, (b) a hydroxyl-substituted poly(hydrocarbyloxy) analog of (a), or a mixture of (a) and (b). The hydroxyamine may be alkanolamine containing from 1 to about 40 carbon atoms, and in one embodiment 1 to about 20 carbon atoms, and in one embodiment 1 to about 10 carbon atoms.

The hydroxyamine may be a primary, secondary or tertiary alkanol amine, or a mixture of two or more thereof. These hydroxyamines may be represented, respectively, by the formulae:

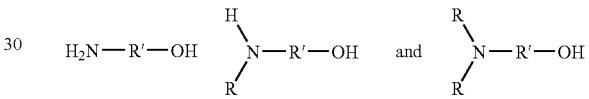

wherein each R is independently a hydrocarbyl group of one to about eight carbon atoms or hydroxyl-substituted hydrocarbyl group of two to about eight carbon atoms and R' is a divalent hydrocarbon group of about two to about 18 carbon atoms. Typically each R is a lower alkyl group of up to seven carbon atoms. The group —R'—OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group.

Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like.

The hydroxyamines may be ether N-(hydroxy-substituted hydrocarbyl)amines. These may be hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines may be conveniently prepared by reaction of epoxides with afore-described amines and may be represented by the formulae:

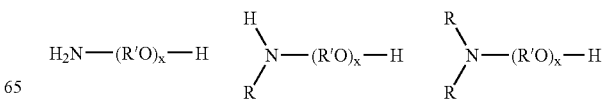

wherein x is a number from about 2 to about 15, and R and R' are as described above.

Polyamine analogs of these hydroxy amines, particularly alkoxylated alkylene polyamines (e.g., N,N-(diethanol)-ethylene diamine) may be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the afore-described primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxy butyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

Examples of the N-(hydroxyl-substituted hydrocarbyl) amines include mono-, di-, and triethanolamine, dimethylethanolamine, diethylethanolamine, di-(3-hydroxylpropyl) amine, N-(3-hydroxylbutyl) amine, N-(4-hydroxylbutyl) amine, N,N-di-(2-hydroxylpropyl) amine, N-(2-hydroxylethyl) morpholine and its thio analog, N-(2-hydroxylethyl) cyclohexylamine, N-3-hydroxyl cyclopentyl amine, o-, m- and p-aminophenol, N-(hydroxylethyl) piperazine, N,N'-di(hydroxyl ethyl) piperazine, and the like.

Further hydroxyamines are the hydroxy-substituted primary amines described in U.S. Pat. No. 3,576,743 by the general formula

wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a$—$NH_2$ wherein $R_a$ is a mono-O or polyhydroxy-substituted alkyl group. It is desirable that at least one of the hydroxyl groups be a primary alcoholic hydroxyl group. Specific examples of the hydroxy-substituted primary amines include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol, 2-amino-2-ethyl-1,3-propanediol, N-(betahydroxypropyl)-N'-(beta-aminoethyl)-piperazine, tris-(hydroxymethyl) aminomethane (also known as trismethylolaminomethane), 2-amino-1-butanol, ethanolamine, beta-(beta-hydroxyethoxy)-ethylamine, glucamine, glusoamine, 4-amino-3-hydroxy-3-methyl-1-butene (which can be prepared according to procedures known in the art by reacting isopreneoxide with ammonia), N-3(aminopropyl)-4-(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxypropane, N-(beta-hydroxy ethoxyethyl)-ethylenediamine, trismethylol aminomethane and the like.

Hydroxyalkyl alkylene polyamines having one or more hydroxyalkyl substituents on the nitrogen atoms, are also useful. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl) ethylene diamine, N,N-bis(2-hydroxyethyl) ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

The product of the reaction between components (A) and (B) during step (I) of the inventive process is a first intermediate product. This product may be an ester or a partial ester when component (B) is a polyol. This product may be an amide, imide, salt, amide/salt, partial amide or mixture of two or more thereof when (B) is a polyamine. This product may be an ester, partial ester, amide, partial amide, amide/salt, imide, ester/salt, salt, or a mixture of two or more thereof when component (B) is a hydroxyamine, a mixture of polyol and polyamine, a mixture of polyol and hydroxyamine, or a mixture of polyamine and hydroxyamine. The salt may be an internal salt involving residues of a molecule of the acid or anhydride and the polyamine or hydroxyamine wherein one of the carboxyl groups becomes ionically bound to a nitrogen atom within the same group; or it may be an external salt wherein the ionic salt group is formed with a nitrogen atom that is not part of the same molecule. During step (I), components (A) and (B) are mixed together and heated at an effective temperature to form the foregoing first intermediate product. In one embodiment, the temperature is in the range of from about 30° C. to about 120° C., and in one embodiment from about 50° C. to about 90° C. The reaction time is typically from about 1 to about 120 minutes, and in one embodiment about 1 to about 60 minutes. Components (A) and (B) may be dispersed or dissolved in a normally liquid, substantially inert organic liquid solvent/diluent during the reaction. In one embodiment, components (A) and (B) are reacted in amounts sufficient to provide an equivalent ratio of (A) to (B) from about 3:1 to about 1:2. In one embodiment, this ratio is from about 1:1 to about 1:2, and in one embodiment about 1:1.4 to about 1:1.9.

During step (II) the first intermediate product from step (I) is heated at a sufficient temperature to form a second intermediate product with water of reaction being formed. The temperature may be in the range of about 130° C. to about 210° C., and in one embodiment about 135° C. to about 150° C. The reaction time is typically from about 1 to about 10 hours, and in one embodiment about 1.5 to about 3 hours. When (B) is a polyol, the second intermediate product comprises one or more bisesters, triesters or low order (about 2 to about 6, and in one embodiment about 2 to about 4) oligomers containing ester, or ester and acid functionality. When (B) is a polyamine, the second intermediate product comprises one or more bisamides, bisimides, amide/imide, or low order (about 2 to about 6, and in one embodiment about 2 to about 4) oligomers containing amide, imide, amide/imide, acid and/or salt functionality. When (B) is a hydroxyamine, the second intermediate product comprises one or more bisamides, bisesters, ester/amides or low order (about 2 to about 6, and in one embodiment about 2 to about 4) oligomers containing ester, amide, acid and/or salt functionality. When (B) is a mixture of a polyol, polyamine and/or hydroxyamine, the second intermediate product comprises one or more of the above-mentioned products depending upon which polyol, polyamine and/or hydroxyamine is used. During step (II) a portion of the water of reaction is separated from the second intermediate product using known techniques (e.g., distillation, azeotropic removal of water, molecular sieves, etc.) to provide the desired partially dehydrated product. When component (A) is a succinic anhydride, the amount of water of reaction that is removed is generally from about 0.2 to about 0.9 moles of water per equivalent of succinic anhydride, and in one embodiment about 0.3 to about 0.8 moles of water per equivalent of succinic anhydride, and in one embodiment about 0.4 to about 0.6 moles of water per equivalent of succinic anhydride. When component (A) is a succinic acid, the amount of water of reaction that is removed is generally from about 1.2 to about 1.9 moles of water per equivalent of succinic acid, and in one embodiment about 1.3 to about 1.8 moles of water per equivalent of succinic acid, and in one embodiment about 1.4 to about 1.6 moles of water per equivalent of succinic acid.

The inventive reaction product may be added directly to the inventive emulsion. Alternatively, it may be diluted with a normally liquid organic diluent such as mineral oil, naphtha, benzene, or toluene to form an additive concentrate. The normally liquid organic diluent may be one or more of the precursors or reactants used to make the inventive reaction product, or one or more of the oils or fuels used to make the inventive emulsions described herein. The concentrate usually contains from about 10% to about 90% by weight of the inventive reaction product and may contain, in addition, one or more other additives known in the art or described herein.

In the following examples as well as throughout the specification and in the claims, unless otherwise indicated, all parts and percentages are by weight, all temperatures are in degrees Celsius (°C), and all pressures are at or near atmospheric.

EXAMPLE 1

A five-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (1740.8 g, 3.71 mol). The contents of the flask are stirred and heated to 64° C. Diethanolamine (590 g, 5.62 mol) is added via the addition funnel over 35 minutes. The mixture undergoes an exothem to 105° C. The mixture is heated to 140° C. over 20 minutes and held at that temperature for 2 hours and 40 minutes. Water of reaction (24 g) is removed. The product has a TAN of 53 mg of KOH/g and a TBN of 53.7 mg of KOH/g.

EXAMPLE 2

A five-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (1715 g, 3.66 mol). The contents of the flask are stirred and heated to 50° C. Diethanolamine (653 g, 6.22 mol) is added via the addition funnel over 25 minutes (reaction undergoes an exotherm to 120° C.). The mixture is heated to 140° C. and held at that temperature for 5 hours. Water of reaction (35 g) is removed. The product has a TAN of 37 mg of KOH/g, and a TBN of 57 mg of KOH/g.

EXAMPLE 3

A five-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (2133 g, 4.55 mol). The contents of the flask are stirred and heated to 64° C. Glycerol (628 g, 6.83 mol) is added via the addition funnel over 20–25 minutes. The mixture is heated to 150° C. over 40 minutes. The temperature of the reaction mixture is increased from 150° C. to 170° C. over a period of 5 hours and maintained at 170° C. for an additional hour. Water of reaction (45 g) is removed. The product has a TAN of 38 mg of KOH/g.

EXAMPLE 4

A three-liter, four-neck flask fitted with an overhead stirrer, a thermocouple, an addition funnel topped with a $N_2$ inlet, and a Dean-Stark trap topped with a condenser is charged with $C_{18-30}$ alkenyl succinic anhydride (1360.6 g, 2.90 mol). The contents of the flask are stirred and heated to 63° C. Diethanolamine (406 g, 3.87 mol) is added via the addition funnel over 27 minutes. During the addition, the reaction mixture undergoes an exotherm to 114° C. The temperature is increased to 140° C. over 15 minutes by external heating, and maintained at that temperature for 45 minutes. Water of reaction (18 g) is removed. The mixture is cooled to room temperature. The TAN of the final product is 60.7 mg of KOH/g.

EXAMPLE 5

A two-liter, four-neck flask equipped with a stopcock drain, an overhead stirrer, a thermocouple, an addition funnel topped with a $N_2$ inlet, and a Dean-Stark trap topped with a water condenser, is charged with $C_{18-30}$ alkenyl succinic anhydride (1050.3 g, 2.24 mol). The contents of the flask are heated to 60° C. Triethanolamine (158.7 g, 1.06 mol) and glycerol (293.9 g, 3.19 mol) are added sequentially over a 30-minute period. During the triethanolamine addition, the reaction mixture undergoes an exotherm to 90° C. Upon completion of glycerol addition, the reaction, mixture is stirred and heated to 140° C., and maintained at that temperature for 5 hours to provide the final product which is in the form is a viscous brown liquid. Water of reaction (25 g) is removed. The product has a TAN of 29.3 mg of KOH/g, a TBN of 39.8 mg of KOH/g, and a nitrogen content of 0.98% by weight.

EXAMPLE 6

A one-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (251.4 g, 0.57 mol) and a mixture of $C_{16}$–$C_{18}$ alpha olefins (140.3 g).

The contents of the flask are stirred and heated to 90° C. A polyamine bottoms product corresponding predominately to tetraethylene pentamine (29.6 g, 0.71 mol), is added dropwise via the addition funnel. The mixture undergoes an exotherm to 110'''C. The mixture is maintained at 100° C. for 3.5 hours. Water of reaction (3.15 g) is removed. The product has a TAN of 49.7 mg of KOH/g.

EXAMPLE 7

A one-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (315.6 g, 0.72 mol) and a mixture of $C_{16}$–$C_{18}$ alpha olefins (167.0 g). The contents of the flask are stirred and heated to 90° C. A polyamine bottoms product corresponding predominately to tetraethylene pentamine (30 g, 0.72 mol) is added via the addition funnel over 10 minutes. The mixture undergoes an exotherm to 120° C. The mixture is maintained at 100° C. with stirring for 3.5 hours. Water of reaction (4.0 g) is removed. The product has a TAN of 55.4 mg of KOH/g.

EXAMPLE 8

A one-pint jar is charged with propylene tetramer substituted succinic anhydride (267 g) and diethanol amine (63 g) and heated to 160° C. with stirring over a period of 30 minutes. A nitrogen sparge at a rate of 5 standard cubic feet per hour is used during the heating period. Water of reaction is removed. The color of the liquid mixture changes from lemon-yellow to orange-amber.

EXAMPLE 9

A one-liter, five-neck flask is charged with propylene tetramer substituted succinic anhydride (296 g), glycerine (96 g) and triethanol amine (176 g). The mixture is heated to 110° C. with stirring and a nitrogen purge. The temperature is maintained at 110° C. for 1 hour, then heated to 230° C. over a period of 3 hours. Water (23 g) is removed. The mixture is cooled to 100° C. and filtered.

EXAMPLE 10

A two-liter, three-neck flask is charged with propylene tetramer substituted succinic anhydride (592 g), glycerine (384 g), toluene (300 ml) and p-$CH_3C_6H_4SO_3.H_2O$ (10 g). The mixture is heated to reflux with stirring and a nitrogen purge (0.05 standard cubic feet per hour) and held at reflux for 3 hours. The temperature increases from 12° C. to 135° C. during this period. Water (40 g) and toluene (150 ml) are removed. The temperature is cooled to 90° C. and a 50% aqueous solution of NaOH (4.3 g) is added dropwise with stirring. The mixture is stirred for 15 minutes. Toluene is stripped from the mixture at 110'''C and 15 mmHg. The mixture is filtered.

Emulsions

The inventive partially dehydrated reaction products are useful as emulsifiers in emulsions. These emulsions are comprised of an organic phase, an aqueous phase and an emulsifying amount of inventive reaction product. The emulsions may be water-in-oil emulsions or oil-in-water emulsions. The term "oil-in-water" emulsion (abbreviated "o/w" emulsion) refers to emulsions wherein the continuous phase is aqueous and the discontinuous phase is organic, the discontinuous organic phase being dispersed in the continuous aqueous phase. The term "water-in-oil" emulsion (abbreviated "w/o" emulsion) refers to emulsions wherein the continuous phase is organic and the discontinuous phase is aqueous, the discontinuous aqueous phase being dispersed in the continuous organic phase. The emulsions may contain from about 0.5% to about 99.5% by weight aqueous phase and from about 99.5% to about 0.5% by weight organic phase. The emulsions may contain from about 10% to about 90% by weight, and in one embodiment about 20% to about 80% by weight aqueous phase; and from about 90% to about 10%, and in one embodiment about 80% to about 20% organic phase. In one embodiment, the emulsion is water-in-oil emulsion (sometimes referred to as an "invert" emulsion) and the weight ratio of the aqueous phase to the organic phase ranges from about 1:1 to about 99.5:1, and in one embodiment about 2:1 to about 99:1. In one embodiment, the emulsion is a high internal phase emulsion and the weight ratio of the aqueous phase to the organic phase is at least about 4:1, and in one embodiment at least about 5:1, and one embodiment at least about 8:1.

The organic phase of the emulsions may be based on a widely diverse group of oils, including natural oils, synthetic oils, and mixtures thereof. The natural oils include animal oils and vegetable oils (e.g., castor oil, lard oil) as well as mineral oils such as liquid petroleum oils and solvent treated or acid-treated mineral oils of the paraffinic, naphthenic or mixed paraffinic-naphthenic types. Oils derived from coal or shale are also useful. Synthetic oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); poly(1-hexenes), poly-(1-octenes), poly(1-decenes), etc. and mixtures thereof; alkyl-benzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_{3-8}$ fatty acid esters, or the $C_{13}$Oxo acid diester of tetraethylene glycol.

Another suitable class of synthetic oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl) silicate, tetra-(4-methyl-hexyl)silicate, tetra-(p-tert-butylphenyl) silicate, hexyl-(4-methyl-2pentoxy)disiloxane, poly(methyl) siloxanes, poly(methylphenyl)siloxanes, etc.). Other synthetic oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

As indicated above, the inventive reaction products are useful in making emulsions for a wide variety of applications. These include explosive emulsions, emulsion fertilizers, water-blended fuels, lubricants and/or functional fluids, acidizing fluids, and the like.

Explosives Emulsions

The explosive emulsions include water-in-oil emulsions which comprise a discontinuous oxidizer phase comprising water and at least one oxygen-supplying component, a continuous organic phase comprising at least one carbonaceous fuel, and an emulsifying amount of the inventive reaction product.

The continuous organic phase may be present at a level of at least about 2% by weight, and in one embodiment in the range of from about 2% to about 15% by weight, and in one embodiment from about 3.5% to about 8% by weight based on the total weight of explosive emulsion. The discontinuous oxidizer phase may be present at a level of at least about 85% by weight, and in one embodiment at a level in the range of from about 85% to about 98% by weight, and in one embodiment about 92% to about 96.5% by weight based on the total weight of the explosive emulsion. The inventive reaction product may be present at a level in the range from about 5% to about 50% by weight, and in one embodiment from about 10% to about 20% by weight based on the total weight of the organic phase. The oxygen-supplying component may be present at the level in the range of about 70% to about 95% by weight, and in one embodiment about 85% to about 92% by weight, and in one embodiment from 87% to about 90% by weight based on the total weight of the oxidizer phase. The water may be present at a level in the range of about 5% to about 30% by weight, and in one embodiment about 8% to about 15% by weight, and in one embodiment about 10% to about 13% by weight based on the weight of the oxidizer phase.

The carbonaceous fuels that are useful in these explosive emulsions include most hydrocarbons, for example, paraffinic, olefinic, naphthenic, aromatic, saturated or unsaturated hydrocarbons, and may be in the form of an oil or a wax or a mixture thereof. In general, the carbonaceous fuel is a water-immiscible, emulsifiable hydrocarbon that is either liquid or liquefiable at a temperature of up to about 95° C., and in one embodiment between about 40° C. and about 75° C. Any of the natural or synthetic oils discussed above may be used as the carbonaceous fuel.

Examples of useful oils include a white mineral oil available from Witco Chemical Company under the trade designation KAYDOL; a white mineral oil available from Shell under the trade designation ONDINA; and a mineral oil available from Pennzoil under the trade designation N-750-HT. Diesel fuel (e.g., Grade No. 2-D as specified in ASTM-D975) can be used as the oil.

The carbonaceous fuel may be any wax having melting point of at least about 25° C., such as petrolatum wax, microcrystalline wax, and paraffin wax, mineral waxes such as ozocertie and montan wax, animal waxes such as spermacetic wax, and insect waxes such as beeswax and Chinese wax. Useful waxes include waxes identified by the trade designation MOBILWAX 57 which is available from Mobil Oil Corporation; D02764 which is a blended wax available from Astor Chemical Ltd.; and VYBAR which is available from Petrolite Corporation. Useful waxes are blends of microcrystalline waxes and paraffin.

In one embodiment, the carbonaceous fuel includes a combination of a wax and an oil. In this embodiment, the wax content may be at least about 25% by weight, and in one embodiment from about 25% to about 90% by weight of the organic phase; and the oil content may be at least about 10%, and in one embodiment from about 10% to about 75% by weight of the organic phase.

The explosive emulsions may also contain up to about 15% by weight of an auxiliary fuel, such as aluminum, aluminum alloys, magnesium, and the like. Particulate aluminum is a preferred auxiliary fuel.

The oxygen-supplying component may be an inorganic oxidizer salt such as ammonium, alkali or alkali or alkaline earth metal nitrate, chlorate or perchlorate. Examples include ammonium nitrate, sodium nitrate, calcium nitrate, ammonium chlorate, sodium perchlorate and ammonium perchlorate. Ammonium nitrate is especially useful. Mixtures of ammonium nitrate and sodium or calcium nitrate are also useful. In one embodiment, the inorganic oxidizer salt comprises principally ammonium nitrate, although up to about 25% by weight of the oxidizer phase may comprise either another inorganic nitrate (e.g., alkali or alkaline earth metal nitrate) or an inorganic perchlorate (e.g., ammonium perchlorate or an alkali or alkaline earth metal perchlorate) or a mixture thereof.

In one embodiment, closed-cell, void-containing materials are used as sensitizing components. The term "closed-cell, void-containing material" is used herein to mean any particulate material which comprises closed cell, hollow cavities. Each particle of the material can contain one or more closed cells, and the cells can contain a gas, such as air, or can be evacuated or partially evacuated. In one embodiment, sufficient closed cell void containing material is used to yield a density in the resulting emulsion of from about 0.8 to about 1.35 g/cc. In general, the explosive emulsions may contain up to about 15% by weight, and in one embodiment about 0.25% to about 15% by weight of the closed cell void containing material. Useful closed cell void containing materials include discrete glass spheres having a particle size within the range of about 10 to about 175 microns. In general, the bulk density of such particles may be within the range of about 0.1 to about 0.4 g/cc. Useful glass microbubbles or microballoons which can be used are the microbubbles sold by 3M Company and which have a particle size distribution in the range of from about 10 to about 160 microns and a nominal size in the range of about 60 to 70 microns, and densities in the range of from about 0.1 to about 0.4 g/cc; these include microballoons distributed under the trade designation C15/250. Other useful glass microbubbles are sold under the trade designation of ECCO-SPHERES by Emerson & Cumming, Inc., and generally have a particle size range from about 44 to about 175 microns and a bulk density of about 0.15 to about 0.4 g/cc. Other suitable microbubbles include the inorganic microspheres sold under the trade designation of Q-CEL by Philadelphia Quartz Company. The closed cell void containing material may be made of inert or reducing materials. For example, phenol-formaldehyde microbubbles can be utilized. If the phenol-formaldehyde microbubbles are utilized, the microbubbles themselves are a fuel component for the explosive. Another closed cell void containing material which may be used are saran microspheres sold by Dow Chemical Company. The saran microspheres have a diameter of about 30 microns and a particle density of about 0.032 g/cc.

Gas bubbles which are generated in-situ by adding to the composition and distributing therein a gas-generating material such as, for example, an aqueous solution of sodium nitrite, can be used to sensitize the explosive emulsions. Other suitable sensitizing components which may be employed alone or in addition to the foregoing include insoluble particulate solid self-explosives such as, for example, grained or flaked TNT, DNT, RDX and the like and water-soluble and/or hydrocarbon-soluble organic sensitizers such as, for example, amine nitrates, alkanolamine nitrates, hydroxyalkyl nitrates, and the like. The explosives emulsions may be formulated for a wide range of applications. Any combination of sensitizing components may be selected in order to provide an explosive composition of virtually any desired density, weight-strength or critical diameter. The quantity of solid self-explosive ingredients and of water-soluble and/or hydrocarbon-soluble organic sensitizers may comprise up to about 40% by weight of the total explosive emulsion. The volume of the occluded gas component may comprise up to about 50% of the volume of the total explosive emulsion.

Optional additional materials may be incorporated in the explosive emulsions in order to further improve sensitivity, density, strength, rheology and cost of the final explosive. Typical of materials found useful as optional include, for example, particulate non-metal fuels such as sulfur, gilsonite and the like, particulate inert materials such as sodium chloride, barium sulphate and the like, water phase or hydrocarbon phase thickeners such as guar gum, polyacrylamide, carboxymethyl or ethyl cellulose, biopolymers, starches, elastomeric materials, and the like, crosslinkers for the thickeners such as potassium pyroantimonate and the like, buffers or pH controllers such as sodium borate, zinc nitrate and the like, crystals habit modifiers such as alkyl naphthalene sodium sulphonate and the like, liquid phase extenders such as formamide, ethylene glycol and the like and bulking agents and additives of common use in the explosives art. The quantities of optional additional materials used may comprise up to about 50% by weight of the total explosive emulsion.

A useful method for making the explosive emulsions comprises the steps of (1) mixing water, inorganic oxidizer salts (e.g., ammonium nitrate) and, in certain cases, some of the supplemental water-soluble compounds, in a first premix, (2) mixing the carbonaceous fuel, the emulsifying reaction product of the invention and any other optional oil-soluble compounds in a second premix and (3) adding the first premix to the second premix in a suitable mixing apparatus, to form a water-in-oil emulsion. The first premix may be heated until all the salts are completely dissolved. The solution may be filtered if needed in order to remove any insoluble residue. The second premix may be also heated to liquefy the ingredients. Any type of apparatus capable of either low or high shear mixing can be used to prepare these water-in-oil emulsions. Closed-cell void containing materials, gas-generating materials, solid self-explosive ingredients such as particulate TNT, solid fuels such as aluminum or sulfur, inert materials such as barytes or sodium chloride, undissolved solid oxidizer salts and other optional materials, if employed, may be added to the emulsion and simply blended until homogeneously dispersed throughout the composition.

The explosive emulsions may be prepared by adding the second premix liquefied organic solution phase to the first premix hot aqueous solution with sufficient stirring to invert the phases. However, this method usually requires substantially more energy to obtain the desired dispersion than does the preferred reverse procedure. Alternatively, these explosive emulsions are particularly adaptable to preparation by a continuous mixing process where the two separately prepared liquid phases are pumped through a mixing device wherein they are combined and emulsified.

Illustrative explosive emulsions are provided in Table I. In Table I all numerical values are in parts by weight.

TABLE I

|  | A | B |
|---|---|---|
| Product of Example 1 | 1 | — |
| Product of Example 7 | — | 1 |
| Mineral Oil | 6 | 6 |
| Water | 14.6 | 14.6 |
| Ammonium nitrate | 77.2 | 77.2 |

Emulsion Fertilizers

The emulsion fertilizers are water-in-oil emulsions which employ the inventive reaction product as an emulsifier. These emulsions are comprised of a discontinuous aqueous fertilizer phase comprising at least one water soluble fertilizer component, a continuous organic phase comprising at least one oil, and an emulsifying amount of the inventive reaction product. The emulsion fertilizers share some characteristics with the foregoing explosive emulsions. For example, both are water-in-oil emulsions, and both may include ammonium nitrate as a component. However, the emulsion fertilizers are different from the explosive emulsions in that the ability to detonate is a necessary feature of the emulsion explosives and is an undesirable characteristics of an emulsion fertilizer. There are several methods which may be used to assure that emulsion fertilizer is non-explosive. It is important to avoid materials which may act as sensitizers in emulsions explosives. These explosive sensitive include glass or resin microspheres or other gas containing particles, self explosive materials such as TNT, DNT, RDX and the like and various organic nitrates. Emulsion explosives may contain particulate oxygen supplying salts such as potassium perchlorate. Extra quantities of oxygen supply salts are to be avoided in fertilizer compositions. Ammonium nitrate is commonly used in emulsion explosives. It also a valuable fertilizer ingredient. Urea may be used to replace some of the ammonium nitrate. Such replacement results in an emulsion which is less explosive. The inclusion of other fertilizers components which are not oxidizing salts, such as phosphates tend to make the emulsions less explosive. By use of the one or combinations of the methods discussed above-the emulsion fertilizers of the invention may be rendered non-explosive.

The water soluble fertilizer components include the major fertilizer components which supply nitrogen, potassium and phosphorous. Optionally, various components to supply specialized nutrients may be included. Thus, if a particular soil is deficient in a trace element a useable form of this element could be included in the emulsion. Examples of such trace elements include boron, iron, manganese, sulfur, zinc, copper and molybdenum. These materials may be used in the form of their salts, or in other suitable form. If the salts are soluble, they may be incorporated in the aqueous phase, and if insoluble, they may be supplied by organic material such as urea, guanidine, and their salts, as well as by inorganic materials such as ammonium nitrate, alkali metal nitrates, and alkaline earth nitrates. Potassium may be supplied by potassium salts such as carbonate, chloride, nitrate, phosphates, pyrophosphate, and sulfate. Phosphorous may be supplied by alkali and alkaline earth metal phosphate salts.

The continuous organic phase, that is, the oil phase that is useful in the emulsion fertilizers of the invention may include oils from a variety of sources, including natural and synthetic oils and mixtures thereof similar to those discussed above.

The biodegradability of the oil phase is important in fertilizer compositions. Thus the more biodegradable mineral oils are favored over the heavier less biodegradable oils. Vegetable oils are favored because of their biodegradability and because of their ready availability. Usable vegetable oils include babbasu, palm, castor, olive, peanut, rapeseed, corn, sesame, coconut, cottonseed, soybean, linseed, sunflower and safflower. It has been found that vegetable oils in general form emulsions which release the fertilizer components more quickly than emulsions prepared from mineral oils. Accordingly, the type of oil employed in preparing the emulsion fertilizer may also be used to control the rate of release of the fertilizer components. Pure vegetable oil, or mixtures of vegetable oil and mineral oils may be used to obtain the exact rate of release desired.

The continuous organic phase may be present at a level of at least about 2% by weight, and in one embodiment in the range of from about 2% to about 15% by weight, and in one embodiment in the range of from about 3.5% to about 8% by weight based on the total weight of fertilizer emulsion. The discontinuous fertilizer phase may be present at a level of at least about 85% by weight, and in one embodiment at a level in the range of about 85% to about 98% by weight, and in one embodiment from about 92% to about 96.5% by weight based on the total weight of said fertilizer emulsion. The inventive reaction product may be present at a level in the range of from about 4% to about 40% by weight, and in one embodiment from about 12% to about 20% by weight based on the total weight of the organic phase. The fertilizer component or components may be present at a level in the range of from about 70% to about 95% by weight, and in one embodiment from about 85% to about 92% by weight, and in one embodiment from about 87% to about 90% by weight based on the total weight of the aqueous phase. The water may be present at a level in the range of about 5% to about 30% by weight, and in one embodiment about 8% to about 15% by weight, and in one embodiment about 10% to about 13% by weight based on the weight of the aqueous phase.

The emulsion fertilizers may be prepared by dissolving the inventive reaction product in the oil phase, and adding the aqueous phase with stirring. The aqueous phase is prepared by dissolving the fertilizer components in water. Only moderate shear mixing is required. Both stirred and static mixers are useable in preparing the emulsion fertilizers.

The fertilizer composition may include solid fertilizer components suspended in the emulsion. The suspended components may include any of the water soluble fertilizer components noted above. Since these components are suspended in the emulsion, but are not protected by the continuous oil phase, they will be released rather quickly. By this means, a fertilizer may be prepared which provides for early release of some components, and delayed release of the rest. For example, a fertilizer could be prepared which releases some nitrogen early and delays the rest. Such a fertilizer could provide a fertilizer dosage in one application which would require two applications of conventional fertilizer. In addition, soil conditioning components, which are insoluble in water could be suspended in the fertilizer emulsion. For example powdered limestone could be suspended in the fertilizer. The limestone would serve to correct the pH balance of acid soils.

Illustrative emulsion fertilizers are provided in Table II. In Table II all numerical values are in parts by weight.

TABLE II

|  | A | B | C |
|---|---|---|---|
| Product of Example 1 | 1 | — | — |
| Product of Example 5 | — | 1 | — |
| Product of Example 7 | — | — | 1 |
| Durasyn 162 (product of Durasyn identified as a poly alpha olefin) | 3 | 3 | 3 |
| Vegetable Oil | 1 | 1 | 1 |
| Water | 4.75 | 4.75 | 4.75 |
| Ammonium nitrate | 47.27 | 47.27 | 47.27 |
| Urea | 42.6 | 42.6 | 42.6 |

Water-Blended Fuels

The inventive reaction products are useful as emulsifiers in making water-blended fuels (sometimes referred to as aqueous hydrocarbon fuels). These water-blended fuels are comprised of a continuous phase of a normally liquid hydrocarbon fuel, a discontinuous aqueous phase, and an emulsifying amount of the inventive reaction product.

The water used in making these water-blended fuels may be taken from any convenient source. In one embodiment, the water is deionized prior to being mixed with the normally liquid hydrocarbon fuel. In one embodiment, the water is purified using reverse osmosis or distillation. The water may be present in the water-blended fuel at a concentration of about 5 to about 40% by weight, and in one embodiment about 10 to about 30% being weight, and in one embodiment about 15 to about 25% by weight.

The normally liquid hydrocarbon fuel may be a hydrocarbonaceous petroleum distillate fuel such as motor gasoline as defined by ASTM Specification D439 or diesel fuel or fuel oil as defined by ASTM Specification D396. Normally liquid hydrocarbon fuels comprising non-hydrocarbonaceous materials such as alcohols, ethers, organo-nitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Normally liquid hydrocarbon fuels which are mixtures of one or more hydrocarbonaceous fuels and one or more non-hydrocarbonaceous materials are also contemplated. Examples of such mixtures are combinations of gasoline and ethanol and of diesel fuel and ether.

In one embodiment, the normally liquid hydrocarbon fuel is gasoline, that is, a mixture of hydrocarbons having an ASTM distillation range from about 60° C. at the 10% distillation point to about 205° C. at the 90% distillation point.

The diesel fuels that are useful with this invention can be any diesel fuel. These diesel fuels typically have a 90% point distillation temperature in the range of about 300° C. to about 390° C., and in one embodiment about 330° C. to about 350° C. The viscosity for these fuels typically ranges from about 1.3 to about 24 centistokes at 40° C. The diesel fuels can be classified as any of Grade Nos. 1-D, 2-D or 4-D as specified in ASTM D975. These diesel fuels may contain alcohols and esters. In one embodiment the diesel fuel has a sulfur content of up to about 0.05% by weight (low-sulfur diesel fuel) as determined by the test method specified in ASTM D2622-87.

The normally liquid hydrocarbon fuel is present in the water-blended fuel compositions of the invention at a concentration of about 50% to about 95% by weight, and in one embodiment about 60% to about 95% by weight, and in one embodiment about 65% to about 85% by weight, and in one embodiment about 70% to about 80% by weight.

The inventive reaction product may be present in the water-blended fuel at a concentration in the range of about 0.05% to about 15% by weight, and in one embodiment about 0.05% to about 10%, and in one embodiment about 0.05% to about 5%, and in one embodiment about 0.1% to about 2% by weight.

In addition to the inventive reaction product, other additives which are well known to those of skill in the art may be used. These include antiknock agents such as tetraalkyl lead compounds, lead scavengers such as haloalkanes (e.g., ethylene dichloride and ethylene dibromide), ashless dispersants, deposit preventers or modifiers such as triaryl phosphates, dyes, cetane improvers, anti-oxidants such as 2,6-di-tertiary-butyl-4-methylphenol, rust inhibitors such as alkylated succinic acids and anhydrides, bacteriostatic agents, gum inhibitors, metal deactivators, demulsifiers, upper cylinder lubricants and anti-icing agents. Water-soluble salts capable of forming positive and negative ions in an aqueous solution that do not interfere with the other additives or the hydrocarbon fuel may be added. These include organic amine nitrates, azides, and nitro compounds. Also included are alkali and alkaline earth metal carbonates, sulfates, sulfides, sulfonates, and the like. Particulary useful are the amine or ammonium salts (e.g., ammonium nitrate). These additives may be used at concentrations of up to about 1% by weight based on the total weight of the water-blended fuel compositions, and in one embodiment about 0.01 to about 1% by weight.

In one embodiment, the water-blended fuel compositions contain an antifreeze agent. The antifreeze agent is typically an alcohol. Examples include ethylene glycol, propylene glycol, methanol, ethanol, and mixtures thereof. Methanol, ethanol and ethylene glycol are particularly useful. The antifreeze agent is typically used at a concentration sufficient to prevent freezing of the water used in the inventive composition. The concentration is therefore dependent upon the temperature at which the process is operated or the temperature at which the fuel is stored or used. In one embodiment, the concentration is at a level of up to about 10% by weight, and in one embodiment about 0.1% to about 10% by weight of the water-blended fuel composition, and in one embodiment about 1% to about 5% by weight.

The water-blended fuels may be prepared by dissolving the inventive reaction product as well as one or more of the other optional additives referred to above in the fuel phase, and then adding the aqueous phase using high-shear mixing. The antifreeze agent, if used, is typically added to the aqueous phase prior to being blended with the fuel.

Illustrative water-blended fuels are provided in Table III. In Table III all numerical values are in parts by weight.

TABLE III

|  | A | B | C |
|---|---|---|---|
| Product of Example 1 | 0.8 | — | — |
| Product of Example 3 | — | 0.8 | — |
| Product of Example 7 | — | — | 0.8 |
| Diesel Fuel | 79.6 | 79.6 | 79.6 |
| Water | 19.6 | 19.6 | 19.6 |

Lubricants and/or Functional Fluids

The emulsions of the invention may be used as lubricants and/or functional fluids. These emulsions are typically comprised of an oil phase an aqueous phase, an emulsifying amount of the inventive reaction product, and at least one functional additive. The emulsion may be a water-in-oil emulsion or an oil-in-water emulsion. The lubricants and/or functional fluids include hydraulic fluids, metal working fluids, cutting fluids and the like. These emulsions may contain from about 0.5% to about 70% by weight, and in one embodiment about 2% to about 35% by weight oil; about 30% to about 99.5% by weight, and in one embodiment about 65% to about 98% by weight water; about 0.1% to about 10% by weight, and in one embodiment about 0.1% to about 5% by weight of the inventive reaction product; and about 0.001% to about 5% by weight, and in one embodiment about 0.001% to about 2% by weight of at least one functional additive.

The functional additives that are useful include extreme pressure agents, anti-wear agents, load-carrying agents, dispersants, friction modifiers, lubricity agents, anti-slip agents, film formers, friction modifiers, and mixtures of two or more thereof. As is well known, such additives may function in two or more of the above-mentioned ways; for example, extreme pressure agents often function as load-carrying agents.

These functional additives may include certain solid lubricants such as graphite, molybdenum disulfide and polytetrafluoroethylene and related solid polymers.

These functional additives may include frictional polymer formers. Briefly, these are potential polymer forming materials which are dispersed in a liquid carrier at low concentration and which polymerize at rubbing or contacting surfaces to form protective polymeric films on the surfaces. The polymerizations are believed to result from the heat generated by the rubbing and, possibly, from catalytic and/or chemical action of the freshly exposed surface. A specific example of such materials is dilinoleic acid and ethylene glycol combinations which can form a polyester frictional polymer film. These materials are known to the art and descriptions of them are found, for example, in the journal "Wear", Volume 26, pages 369–392, and German Published Patent Application 2,339,065. These disclosures are hereby incorporated by reference for their discussions of frictional polymer formers.

The functional additives may include metal or amine salts of organo sulfur, phosphorus, boron or carboxylic acids. Typically such salts are of carboxylic acids of 1 to about 22 carbon atoms including both aromatic and aliphatic acids; sulfur acids such as alkyl and aromatic sulfonic acids and the like; phosphorus acids such as phosphoric acid, phosphorus acid, phosphinic acid, acid phosphate esters and analogous sulfur homologs such as the thiophosphoric and dithiophosphoric acid and related acid esters; boron acids include boric acid, acid borates and the like. Useful functional additives also include metal dithiocarbamates such as molybdenum and antimony dithiocarbamates; as well as dibutyl tin sulfide, tributyl tin oxide, phosphates and phosphites; borate amine salts, chlorinated waxes; trialkyl tin oxide, molybdenum phosphates, and chlorinated waxes.

Many useful functional additives are known to the art. For example, descriptions of additives useful in the inventive emulsions may be found in "Advances in Petroleum Chemistry and Refining", Volume 8, edited by John J. McKetta, Interscience Publishers, New York, 1963, pages 31–38 inclusive; Kirk-Othmer "Encyclopedia of Chemical Technology", Volume 12, Second Edition, Interscience Publishers, New York, 1967, page 575 et seq.; "Lubricant Additives" by M. W. Ranney, Noyes Data Corporation, Park Ridge, N.J., U.S.A., 1973; and "Lubricant Additives" by C. V. Smalheer and R. K. Smith, The Lezius-Hiles Co., Cleveland, Ohio, U.S.A. These references are hereby incorporated by reference for their disclosures of functional additives useful in the emulsions of this invention.

In one embodiment, the functional additive is a sulfur or chloro-sulfur extreme pressure agent, known to be useful in oil-base systems. Such materials include chlorinated aliphatic hydrocarbons, such as chlorinated wax; organic sulfides and polysulfides, such as benzyl-disulfide, bis-(chlorobenzyl)disulfide, dibutyl tetrasulfide, sulfurized sperm oil, sulfurized methyl ester of oleic acid, sulfurized alkylphenol, sulfurized dipentene, sulfurized terpene, and sulfurized Diels-Alder adducts; phosphosulfurized hydrocarbons, such as the reaction product of phosphorus sulfide with turpentine or methyl oleate; phosphorus esters such as the dihydrocarbon and trihydrocarbon phosphites, i.e., dibutyl phosphite, diheptyl phosphite, dicyclohexyl phosphite, pentylphenyl phosphite, dipentylphenyl phosphite, tridecyl phosphite, distearyl phosphite and polypropylene substituted phenol phosphite; metal thiocarbamates, such as zinc dioctyldithiocarbamate and barium heptylphenol dithiocarbamate; and Group II metal salts of a phosphorodithioic acid, such as zinc dicyclohexyl phosphorodithioate.

The functional additive may be a film former such as a synthetic or natural latex or emulsion thereof in water. Such latexes include natural rubber latexes and polystyrene butadienes synthetic latex.

The functional additive may be an anti-chatter or anti-squawk agent. Examples of the former are the amide metal dithiophosphate combinations such as disclosed in West German Patent 1,109,302; amine salt-azomethene combinations such as disclosed in British Patent Specification 893, 977; or amine dithiophosphate such as disclosed in U.S. Pat. No. 3,002,014. Examples of anti-squawk agents are N-acyl-sarcosines and derivatives thereof such as disclosed in U.S. Pat. Nos. 3,156,652 and 3,156,653; sulfurized fatty acids and esters thereof such as disclosed in U.S. Pat. Nos. 2,913,415 and 2,982,734; and esters of dimerized fatty acids such as disclosed in U.S. Pat. No. 3,039,967. The above-cited patents are incorporated herein by reference for their disclosure as pertinent to anti-chatter and anti-squawk agents useful as a functional additive in the emulsions of the present invention.

The emulsions of this invention may contain at least one inhibitor for corrosion of metals. These inhibitors may prevent corrosion of either ferrous or non-ferrous metals (e.g., copper, bronze, brass, titanium, aluminum and the like) or both. The inhibitor may be organic or inorganic in nature. Usually it is sufficiently soluble in water to provide a satisfactory inhibiting action though it may function as a corrosion-inhibitor without dissolving in water, thus it need not be water-soluble. Many suitable inorganic inhibitors are known to those skilled in the art. Included are those described in "Protective Coatings for Metals" by Burns and Bradley, Reinhold Publishing Corporation, Second Edition, Chapter 13, pages 596–605. This disclosure relative to inhibitors are hereby incorporated by reference. Specific examples of useful inorganic inhibitors include alkali metal nitrites, sodium di- and tripolyphosphate, potassium and dipotassium phosphate, alkali metal borate and mixtures of the same. Many suitable organic inhibitors are known to those of skill in the art. Specific examples include hydrocarbyl amine and hydroxy-substituted hydrocarbyl amine neutralized acid compound, such as neutralized phosphates and hydrocarbyl phosphate esters, neutralized fatty acids (e.g., those having about 8 to about 22 carbon atoms), neutralized aromatic carboxylic acids (e.g., 4-tertiarybutyl benzoic acid), neutralized naphthenic acids and neutralized hydrocarbyl sulfonates. Mixed salt esters of alkylated succinimides are also useful. Useful amines include the alkanol amines such as ethanol amine, diethanolamine. Mixtures of two or more of any of the afore-described corrosion-inhibitors may be used. The corrosion-inhibitor is usually present in concentrations in which they are effective in inhibiting corrosion of metals with which the inventive emulsions come in contact.

In one embodiment, the emulsions of the present invention (particularly those that are used in cutting or shaping of metal) contain at least one polyol with inverse solubility in water. Such polyols are those that become less soluble as the temperature of the water increases. They may function as surface lubricity agents during cutting or working operations since, as the liquid is heated as a result of friction between a metal workpiece and worktool, the polyol of inverse solubility "plates out" on the surface of the workpiece, thus improving its lubricity characteristics.

The emulsions of the present invention may contain other additives such as bactericides; dyes, e.g., an acid green dye; water softeners, e.g., ethylene diamine tetraacetate sodium salt or nitrilo triacetic acid; odor masking agents, e.g., citronella, oil of lemon, and the like; and anti-foamants, such as the well-known silicone anti-foamant agents.

The emulsions may also include an anti-freeze additive where it is desired to use the composition at a low temperature. Materials such as ethylene glycol and analogous polyoxyalkylene polyols can be used as anti-freeze agents. Clearly, the amount used will depend on the degree of anti-freeze protection desired and will be known to those of ordinary skill in the art.

Illustrative hydraulic fluids are provided in Table IV. In Table IV all numerical values are in parts by weight.

TABLE IV

|  | A | B | C |
|---|---|---|---|
| Product of Example 1 | 0.4 | — | — |
| Product of Example 3 | — | 0.4 | — |
| Product of Example 7 | — | — | 0.4 |
| Mineral Oil | 4 | 4 | 4 |
| Water | 95 | 95 | 95 |
| Overbased calcium sulfonate | 0.25 | 0.25 | 0.25 |
| Dodecyl alcohol | 0.25 | 0.25 | 0.25 |
| Extreme pressure agent (sulfurized olefin) | 0.25 | 0.25 | 0.25 |
| Rust inhibitor (salt derived from dodecyl carboxylic acid and triethanol amine) | 0.05 | 0.05 | 0.05 |
| Biocide (Busan 1060, a product of Buckman Laboratories, Inc. identified as hexahydro-1,3,5-tris(2-hydroxyethyl-S-triazine) | 0.05 | 0.05 | 0.05 |

Acidizing Fluids

The emulsions of the invention may be used as acidizing in enhanced oil recovery processes. These acidizing fluids may be in the form of water-in-oil emulsions and may be comprised of a continuous oil phase, a discontinuous aqueous phase, an emulsifying amount of the inventive reaction produce, and a non-oxidizing acid.

The non-oxidizing acids include inorganic acids such as hydrochloric acid, sulfuric acid, hydrofluoric acid, sulfamic acid, and the like, as well as organic acids containing from 1 to about 3 carbon atoms such as formic acid, acetic acid, propionic acid, and the lie. Mixtures of two or more of the foregoing acids may be used.

The oil phase may be present at a level in the range from about 20% to about 70% by weight, and in one embodiment from about 40% to about 60% by weight based on the total weight of the emulsion. The aqueous phase may be present at a level in the range of from about 30% to about 80% by weight, and in one embodiment from about 40% to about 60% by weight based on the total weight of the emulsion. The inventive reaction product may be present at a level in the range of from about 4% to about 40% by weight, and in one embodiment from about 10% to about 20% by weight based on the total weight of the oil phase. The non-oxidizing acid may be present at a level in the range of from about 10% to about 90% by weight, and in one embodiment from about 30% to about 80% by weight of the total weight of the aqueous phase.

The acidizing fluids optionally may contain one or more oil-soluble surfactants. These surfactants include anionic, cationic and nonionic surfactants. Suitable anionic surfactants include fatty acid soaps which are the salts of long chain fatty acids derived from naturally occurring fats and oils and salts of alkylbenzene sulfonic acids. A useful anionic surfactant is the morpholinium salt of tetracosanyl-benzene sulfonic acid. The ammonium and alkali metal salts are also suitable. Cationic surfactants include amine salts such as polyoxyethylene amine as well as quaternary ammonium compounds. Useful cationic surfactants include high molecular weight alkyl imides and amides of polybasic amines. Suitable nonionic surfactants include derivatives of glycerides, glucosides, polyoxyethylene and polyoxypropylene. Typical nonionic surfactants include ethoxylated linear alcohols and ethoxylated alkylphenols. Mixtures of surfactants may also be used. The acidizing fluids may contain up to about 10% by weight, and in one embodiment from about 0.1% to about 2% by weight of the foregoing surfactants.

The acidizing fluids may be prepared simply by mixing the oil, the water, the inventive reaction product and the non-oxidizing acid, and any other ingredient which may be desirable, in a homogenizer or any other efficient blending device. Heating the emulsion during or after it is prepared is not necessary. The order of mixing of the ingredients is not critical, although it is convenient first to prepare an oil concentrate containing from about 50% to about 95% of the oil-soluble ingredients and from about 5% to about 50% of the oil and then to emulsify the concentrate with a water solution containing the non-oxidizing acid in appropriate proportions.

Reference is herein made to U.S. Pat. Nos. 4,140,640 and 4,233,165 which disclose the preparation and use of water-in-oil acidizing fluids. These patents are incorporated herein by reference.

Illustrative acidizing fluids are provided in Table V. In Table V all numerical values are in parts by weight.

TABLE V

|  | A | B |
|---|---|---|
| Product of Example 1 | 2 | — |
| Product of Example 7 | — | 2 |
| Mineral Oil | 48 | 48 |
| 37% Aqueous hydrochloric acid solution | 50 | 50 |

While the invention has been explained in relation to its preferred embodiments, it is to be understood that various modifications thereof will become apparent to those skilled in the art upon reading the specification. Therefore, it is to be understood that the invention disclosed herein is intended to cover such modification as fall within the scope of the appended claims.

The invention claimed is:

1. A composition comprising a partially dehydrated product made by:
    (I) reacting (A) a hydrocarbyl substituted succinic acid or anhydride with (B) a polyol, a polyamine, a hydroxyamine, or a mixture of two or more thereof, to form a first intermediate product comprising: an ester, partial ester or a mixture thereof when (B) is a polyol; an amide, imide, salt, amide/salt, partial amide or mixture two or more thereof when (B) is a polyamine; or an ester, partial ester, amide, partial amide, amide/salt, imide, ester/salt, salt or a mixture of two or more thereof when (B) is a hydroxyamine, a mixture of a polyol and a polyamine, a mixture of polyol and a hydroxyamine, a mixture of a polyamine and a hydroxyamine, or a mixture of a polyol, a polyamine and a hydroxyamine; the hydrocarbyl sustitutent of said acid or anhydride having an average of about 8 to about 200 carbon atoms; and
    (II) heating said first intermediate product at an effective temperature to form a second intermediate product with water of reaction being formed, and separating a portion of said water of reaction from said second intermediate product to form said partially dehydrated product, when (A) is said succinic anhydride the amount of water of reaction that is separated is from about 0.2 to about 0.9 moles of said water of reaction per equivalent of said succinic anhydride, when (A) is said succinic acid the amount of water of reaction that is separated is from about 1.2 to about 1.9 moles of said water of reacting per equivalent of said succinic acid, said partially dehydrated product having a total acid number in the range of about 20 to about 100 mg of KOH/g.

2. The composition of claim 1 wherein said hydrocarbyl substituent has an average of about 18 to about 30 carbon atoms.

3. The composition of claim 1 wherein a mixture of at least two hydrocarbyl substituted succinic acids or anhydrides is used, the hydrocarbyl substituent of one of said acids or anhydrides having an average of about 12 to about 24 carbon atoms, and the hydrocarbyl substituent of another of said acids or anhydrides having an average of about 60 to about 200 carbon atoms.

4. The composition of claim 1 wherein said hydrocarbyl substituted succinic acid or anhydride consists of hydrocarbyl substituent groups and succinic groups and is characterized by the presence within its structure of at least about 1.3 succinic groups for each equivalent weight of the hydrocarbyl substituent.

5. The composition of claim 1 wherein said polyol is a compound represented by the formula R—(OH)$_m$     (I)

wherein in Formula (I), R is an organic group having a valency of m, R is joined to the OH groups through carbon-to-oxygen bonds, and m is an integer from 2 to about 10.

6. The composition of claim 1 wherein said polyol is a glycol, a polyoxyalkylene glycol, a carbohydrate, or a partially esterfied polyhydric alcohol.

7. The composition of claim 1 wherein said polyol is ethylene glycol, diethylene glycol, triethylene glycol, tetraethylene glycol, propylene glycol, dipropylene glycol, tripropylene glycol, dibutylene glycol, tributylene glycol, 1,2-butanediol, 2,3-dimethyl-2,3-butanediol, 2,3-hexanediol, 1,2-cyclohexanediol, pentaerythritol, dipentaerythritol, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, 2,2,6,6-tetrakis-(hydroxymethyl)cyclohexanol, 1,10-decanediol, digitalose, 2-hydroxymethyl-2-methyl-1,3-propanediol-(trimethylolethane), or 2-hydroxymethyl-2-ethyl-1,3-propanediol-(trimethylopropane).

8. The composition of claim 1 wherein said polyol is a sugar, a starch, or a mixture thereof.

9. The composition of claim 1 wherein said polyol is erythritol, threitol, adonitol, arabitol, xylitol, sorbitol, mannitol, erythrose, fucose, ribose, xylulose, arabinose, xylose, glycose, fructose, sorbose, mannose, sorbitan, glucosamine, sucrose, rhamnose, glyceraldehyde or galactose.

10. The composition of claim 1 wherein said polyol is a compound represented by the formula HO(CH$_2$CH(OH)CH$_2$O)$_n$H wherein n is a number in the range of 1 to about 5.

11. The composition of claim 1 wherein said polyol is a polyhydric alcohol having at least three hydroxyl groups, some of the hydroxyl groups being esterfied with an aliphatic monocarboxylic acid of about 8 to about 30 carbon atoms, at least two of the hydroxyl groups not being esterfied.

12. The composition of claim 1 wherein said polyol is monooleate of glycerol, monostearate of glycerol, monooleate of sorbitol, distearate of sorbitol, or di-dodecanoate of erythritol.

13. The composition of claim 1 wherein said polyamine is an aliphatic, cycloaliphatic, heterocyclic or aromatic compound.

14. The composition of claim 1 wherein said polyamine is a compound represented by the formula

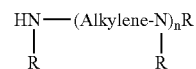

wherein n has an average value between 1 and about 10, the Alkylene group has from 1 to about 10 carbon atoms, and each R is independently hydrogen or an aliphatic or hydroxy-substituted aliphatic group of up to about 30 carbon atoms.

15. The composition of claim 1 wherein said polyamine is ethylene diamine, triethylene tetramine, tris-(2-aminoethyl)amine, propylene diamine, trimethylene diamine, tripropylene tetramine, tetraethylene pentamine, hexaethylene heptamine, pentaethylenehexamine, or a mixture of two or more thereof.

16. The composition of claim 1 wherein said polyamine is an ethylene polyamine.

17. The composition of claim 1 wherein said polyamine is a heterocyclic amine.

18. The composition of claim 1 wherein said hydroxyamine is (a) an N-(hydroxyl-substituted hydrocarbyl) amine, (b) a hydroxyl-substituted poly(hydrocarbyloxy) analog of (a), or a mixture of (a) and (b).

19. The composition of claim 1 wherein said hydroxyamine is an alkanolamine containing from 1 to about 40 carbon atoms.

20. The composition of claim 1 wherein said hydroxyamine is selected from the group consisting of (a) primary, secondary or tertiary alkanol amines represented respectively by the formulae

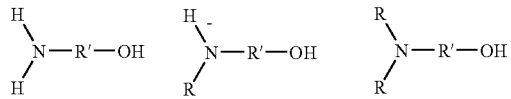

(b) hydroxyl-substituted poly(hydrocarbyloxy) analogs of said primary, secondary or tertiary alkanolamines represented respectively by the formulae

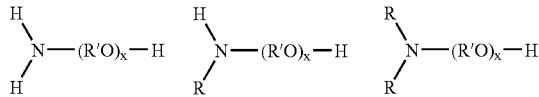

wherein each R independently is a hydrocarbyl group of one to about 8 carbon atoms or a hydroxyl-substituted hydrocarbyl group of 2 to about 8 carbon atoms, each R' independently is a divalent hydrocarbon group of 2 to about 18 carbon atoms, and each x independently is 2 to about 15, and (c) mixtures of two of more of any of the above.

21. The composition of claim 1 wherein (B) is glycerol, diethanolamine, triethanol amine, or a mixture of two or more thereof.

22. The composition of claim 1 wherein the ratio of equivalents of component (A) to component (B) is about 3:1 to about 1:2.

23. A composition comprising a partially dehydrated product made by:

(I) reacting (A) a hydrocarbyl substituted succinic acid or anhydride with (B) a polyamine, a hydroxyamine, a mixture of a polyol and a polyamine, a mixture of a polyol and a hydroxyamine, a mixture of a polyamine and a hydroxyamine, or a mixture of a polyol, a polyamine and a hydroxyamine, to form a first intermediate product comprising: an amide, imide, salt, amide/salt, partial amide or mixture two or more thereof when (B) is a polyamine; or an ester, partial ester, amide, partial amide, amide/salt, amide, ester/salt, salt or a mixture of two or more thereof when (B) is a hydroxyamine, a mixture of a polyol and a polyamine, a mixture of a polyol and a hydroxyamine, a mixture of a polyamine and a hydroxyamine, or a mixture of a polyol, a polyamine and a hydroxyamine; the hydrocarbyl sustitutent of said acid or anhydride having an average of about 8 to about 200 carbon atoms; and (II) heating said first intermediate product at an effective temperature to form a second intermediate product with water of reaction being formed, and separating a portion of said water of reaction from said second intermediate product to form said partially dehydrated product, when (A) is said succinic anhydride the amount of water of reaction that is separated is from about 0.2 to about 0.9 moles of said water of reaction per equivalent of said succinic anhydride, when (A) is said succinic acid the amount of water of reaction that is separated is from about 1.2 to about 1.9 moles of said water of reaction per equivalent of said succinic acid, said partially dehydrated product having a total acid number in the range of about 20 to about 100 mg of KOH/g.

24. A process, comprising:

(I) reacting (A) a hydrocarbyl substituted succinic acid or anhydride with (B) a polyol, a polyamine, a hydroxyamine, or a mixture of two or more thereof, to form a first intermediate product comprising: an ester, partial ester or mixture thereof when (B) is a polyol; an amide, imide, salt, amide/salt, partial amide or mixture of two or more thereof when (B) is a polyamine; or an ester, partial ester, amide, partial amide, amide/salt, imide, ester/salt, salt or a mixture of two or more thereof when (B) is a hydroxyamine, a mixture of a polyol and a polyamine, a mixture of a polyol and a hydroxyamine, a mixture of a polyamine and a hydroxyamine, or a mixture of a polyol, a polyamine and a hydroxyamine; the hydrocarbyl substituent of said acid or anhydride having an average of about 8 to about 200 carbon atoms; and (II) heating said first intermediate product at an effective temperature to form a second intermediate product with water of reaction being formed, and separating a portion of said water of reaction from said second intermediate product, when (A) is said succinic anhydride the amount of water of reaction that is separated is from about 0.2 to about 0.9 moles of said water of reaction per equivalent of said succinic anhydride, when (A) is said succinic acid the amount of water of reaction that is separated is from about 1.2 to about 1.9 moles of-said water of reaction per equivalent of said succinic acid, said partially dehydrated product having a total acid number in the range of about 20 to about 100 mg of KOH/g.

25. A concentrate comprising about 10% to about 90% by weight of a normally liquid organic diluent, and the composition of claim 1.

* * * * *